Dec. 10, 1929.  F. W. GAY  1,739,137

HEAT TRANSFER MEANS FOR ROTATING ELECTRICAL MACHINERY

Filed March 26, 1928  2 Sheets-Sheet 1

INVENTOR
Frazer W. Gay,
BY
George D. Richards
ATTORNEY

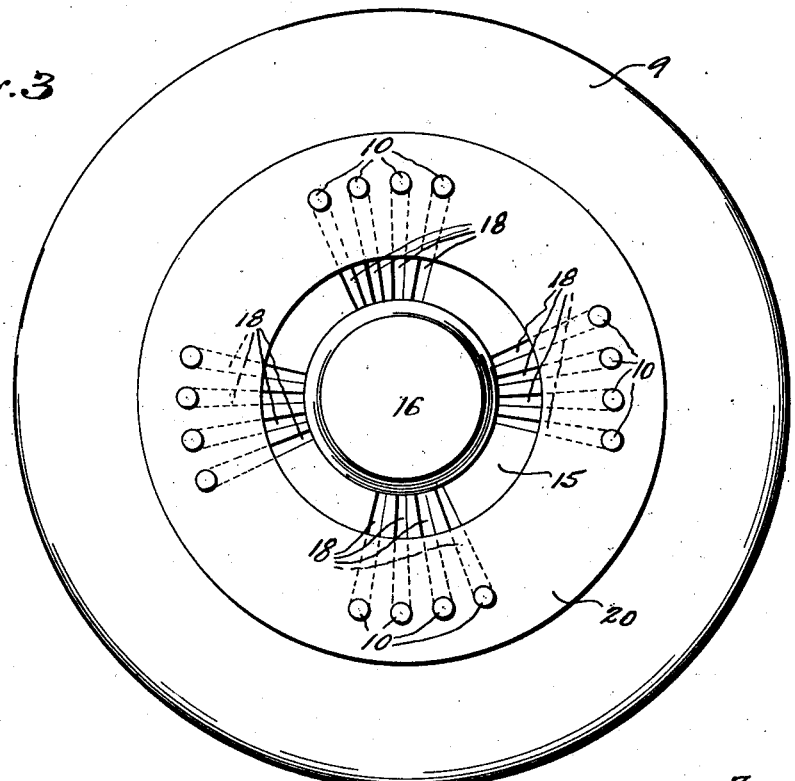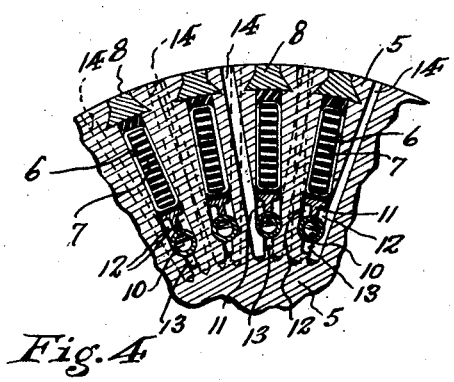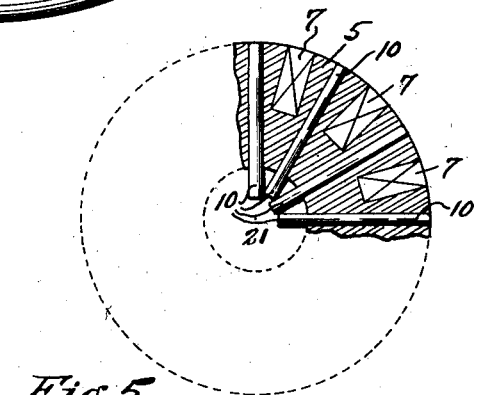

Patented Dec. 10, 1929

1,739,137

UNITED STATES PATENT OFFICE

FRAZER W. GAY, OF NEWARK, NEW JERSEY

HEAT-TRANSFER MEANS FOR ROTATING ELECTRICAL MACHINERY

Application filed March 26, 1928. Serial No. 264,725.

This invention relates, generally, to improvements in means for cooling electrical apparatus, especially rotating electrical machinery such as turbo generators; and the invention has reference, more particularly, to cooling or heat transfer means in combination with the rotors of turbo generators and other types of apparatus having rotating parts.

This invention has for its principal object to provide a novel arrangement and construction of heat transfer means in combination with the rotating member of electrical apparatus, as e. g. the rotor of a generator; said heat transfer means comprising a plurality of hermetically sealed tubes partially filled with a volatile liquid refrigerant, said tubes being arranged and located so as to be exposed to heat generated within the rotating device, whereby the refrigerant contained in said tubes in the manner hereinafter fully set forth.

The invention has for a further object to provide means for circulating a gas, such e. g. as air, about external portions of the tubes to dissipate the heat of the hot vapors of the refrigerant and furthermore to also circulate a gas such as air between hot parts of the rotating member and the internal portions of the tubes to transfer heat from the hot parts of the former to the tubes and their contained refrigerant.

Other objects of this invention, not at this time more particularly enumerated, will be clearly understood from the following detailed description of the same.

One form of the invention is illustrated in the accompanying drawings, in which:—

Figure 1:
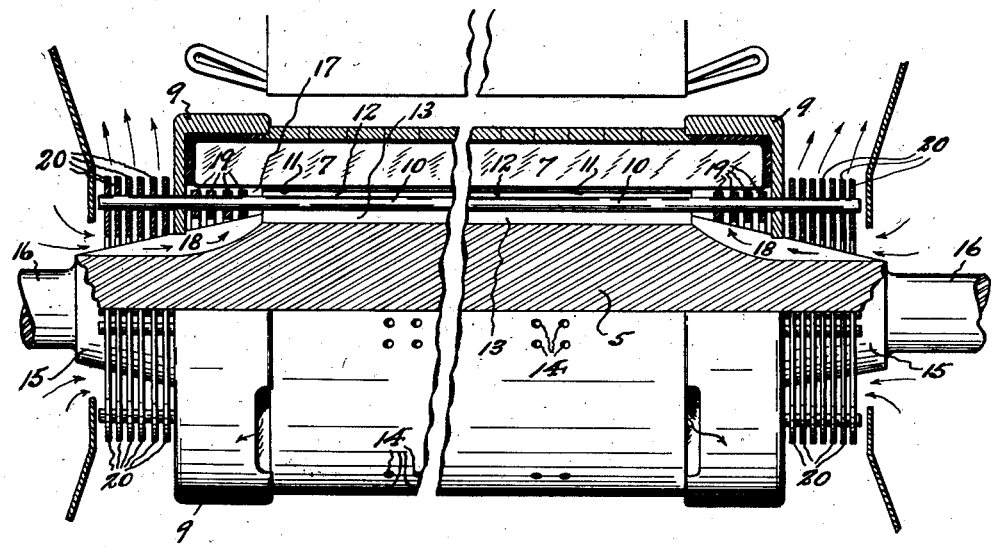
Figure 2:
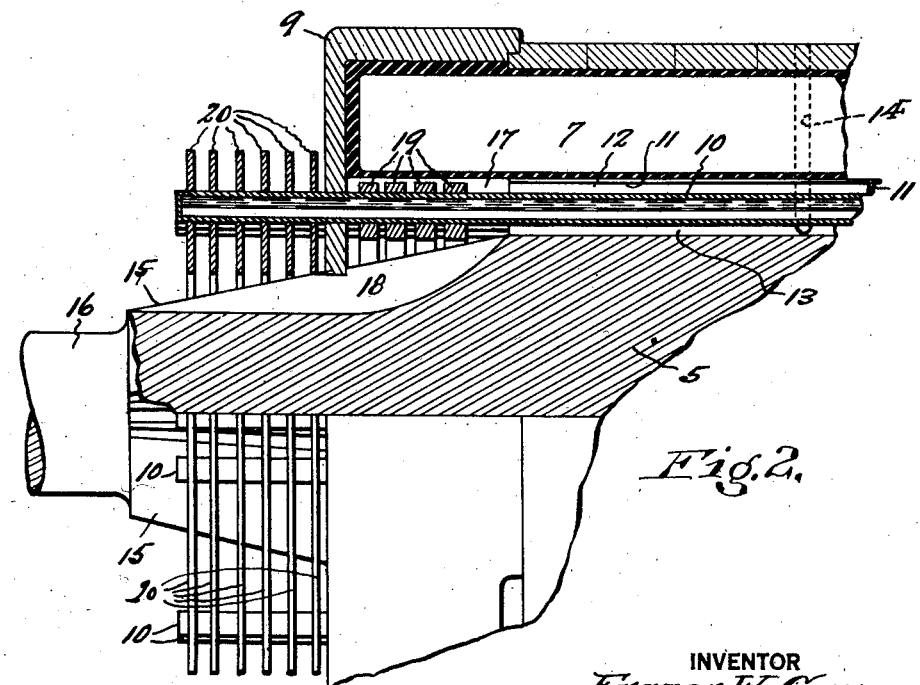

Fig. 1 illustrates the rotor of a generator in part elevation and in part section, the same being equipped with the novel heat transfer means made according to and embodying the principles of this invention; Fig. 2 is a similar fragmentary view on an enlarged scale; Fig. 3 is an end elevation of the same; and Figs. 4 and 5 are fragmentary transverse sections through the same.

Similar characters of reference are employed in all of the above described views, to indicate corresponding parts.

Referring now to said drawings, the reference character 5 indicates a rotor body usually comprising a steel forging having longitudinally extending slots 6 in which are disposed the rotor windings 7, the latter being protected against grounding by suitable insulation in any manner well known to those skilled in the art. The windings 7 are retained in operative assembled relation to the slots of the rotor body against radial displacement by means of wedges 8. The windings 7 are retained against endwise or longitudinal displacement by means of retaining end caps 9.

Arranged in the bottoms of the slots 6, beneath the windings 7, are longitudinally extending tubes 10 which extend endwise therethrough and with their opposite end portions respectively projecting through and exteriorly beyond the end caps 9 at the respective ends of the rotor body. The ends of said tubes are closed and hermetically sealed. Arranged intermediate the windings 7 and the tubes 10, which are disposed in the bottom of the slots 6, are spacer irons 11 of T-shape in cross-section, whereby longitudinal air spaces 12 are provided between the windings 7 and the tubes 10. In order to provide a strong assembly said spacer irons 11 may be welded to the tubes 10 if desired. The bottoms of the slots 6 are milled out to provide longitudinal spaces or channels 13 of reduced width to provide air passageways beneath the tubes 10. The rotor body 5 is provided at a plurality of points intermediate the ends of the slots 6 with oblique outwardly extending openings or passages 14 which intersect the passages 12 and 13 to provide air discharge passages leading outwardly therefrom. The outer ends of the rotor body 5 are provided with tapered hub portions 15 which terminate in the rotor journals 16, and the ends of the passages 12 and 13 open into the space 17 enclosed by the end caps 9. Milled in the hub-portions 15 of the rotor body are a plurality of air intake passages 18, arranged and disposed to deliver air into and for movement through said passages 12 and 13 to be thence discharged through the discharge passages 14. The several tubes are secured in place by end plates or retaining rings 19, which are disposed within the space 17 enclosed by the end caps 9 and beneath the winding heads. The said tubes 10 extend through said retaining rings 19 and are welded thereto. The external end portions of the tubes 10 are engaged with a plurality of combined retaining and radiator rings 20, which not only serve to hold the tubes in operative assembled relation to the rotor structure, but also serve as a means to radiate or dissipate heat from the exterior end portions of the tubes. These rings 20 are also preferably welded to the tubes to strongly unite the same with the rotor structure.

The tubes 10 are partially filled with a suitable volatile liquid refrigerant, whereby the latent heat of evaporation thereof serves to carry off heat in the relatively small volume of gas resulting from such evaporation. When the rotor is in motion, centrifugal force will maintain the liquid refrigerant at the outer sides of the tubes 10 which are opposed to the windings 7.

In operation the novel heat transfer means functions as follows:—

Electric current passing through the copper conductors in the coils or windings 7 generates considerable heat within the rotor structure, which heat is conducted to the insulation of the windings to and through the metal of the rotor body adjacent to the windings, tending to pass to the relatively cooler parts of the rotor body toward the axis thereof, some of this heat is also transferred to the spacer irons 8; and consequently the tendency of the heat is to move by conduction through the aforesaid metal parts toward the ventilating spaces 12 and 13 and the contiguous cooling tubes 10 which afford the relatively cool points of the rotor structure.

During the rotation of the rotor body a certain amount of air is caused to pass between the retaining and radiating rings 20, whereby heat transferred thereto is easily dissipated or radiated away by the air streams. At the same time air is sucked in, by centrifugal action, through the air intake passages 18 and thus into the passages 12 and 13 being discharged by centrifugal force through the discharge passages 14. The internal air streams thus induced bathe the retaining rings 19, tending to keep the same cool, and at the same time moves at comparatively high speed through the passages 12 and 13 contiguous to the tubes 10 and to the hot parts of the rotor body structure. The volatile refrigerant liquid which is maintained by centrifugal force at the outward sides of the tubes and toward the source of generated heat, is caused to boil under the influence of the heat transferred thereto, and the vapor thereof extends along the inward sides of the tubes to the exterior end of the latter, being condensed as it gives up its latent heat to the rings 19 and 20 which radiate the heat to the surrounding air; the condensation of the vapor tends to lower the pressure within the central portions of the tubes, so that the cooling operation continues through the repeated boiling and condensation of the refrigerant. It will thus be apparent that there is a constant flow of hot vapor from the central portions of the tubes 10 to the exterior portions thereof and a return flow of condensed liquid toward the central portions of the tubes, all tending to transfer heat away from the hot internal parts of the rotor structure.

It will also be obvious that the air moving through the passages 12 and 13 and thence outward through the discharge passages 14 is kept in considerable agitation by reason of the high speed of its movement, and that consequently shifting volumes thereof are at a temperature between that of the hot rotor body parts and the cool tube walls, so that heat is constantly flowing from the hot rotor body parts to the tubes 10 and into the volatile refrigerant liquid with the heat dissipating effects already above mentioned. In addition to this a certain amount of heat is also carried away with the air as the latter is discharged outwardly through the discharge passages 14.

While I have shown, for the purposes of illustration, one specific arrangement and location of cooling tubes relative to the rotor structure, it will be understood that it is within the broader scope and principles of the instant invention as defined in the appended claims, to make various modifications as to the arrangement, disposition and grouping of the refrigerant tubes and associated air passages. For example, in the diagrammatic view shown in Fig. 5 of the drawings, I have illustrated the rotor body 5 provided with an axial air passage 21, and have shown the refrigerant tubes 10 arranged radially, with their outer ends imbedded between the winding slots, and their inner ends projecting into said air passage 21 so as to be bathed by air circulated through the latter. Other arrangements are possible without departing from the spirit of this invention.

The heat transfer tubes may be either partially or entirely filled with a fluid of low volatility or of non-volatile character which is adapted however to change its specific gravity under temperature changes. Oil, for example, may be used. In such case the hot oil will tend to flow toward the end or ends of the tubes along one side thereof and the cooled oil back along the opposite side thereof. Such action will also be greatly increased by reason of the high centrifugal force induced by high speed rotation of the member with which the tubes are associated; such force tending to speed up the replacement of the lighter hot oil by the heavier cool oil.

The present invention provides a very advantageous arrangement whereby heat generated in the middle of a long rotor may be transferred to the ends thereof and dissipated; furthermore, the arrangement provides for efficiently transferring heat from the rapidly moving peripheral portions of a rotor structure to the more slowly moving central parts so that the heat can be dissipated to the ambient air without effecting so great a velocity in the contacting air and hence with lower windage losses.

Having thus described my invention, I claim:—

1. In an electrical apparatus having rotating means within which heat is generated during operation, means for dissipating said heat comprising a plurality of sealed tubes partially filled with a volatile liquid refrigerant, said tubes lying partly within and partly without said rotating means whereby the volatile liquid within the interior portions of the tubes is subjected to the generated heat to cause said refrigerant to boil and thus produce a flow of vapor from the interior to the exterior parts of the tubes and a return flow of condensed liquid from the exterior to the interior parts of said tubes, and means for circulating air through said rotating member contiguous to said tubes.

2. In an electrical apparatus having rotating means within which heat is generated during operation, means for dissipating said heat comprising a plurality of sealed tubes partially filled with a volatile liquid refrigerant, said tubes lying partly within and partly without said rotating means whereby the volatile liquid within the interior portions of the tubes is subjected to the generated heat to cause said refrigerant to boil and thus produce a flow of vapor from the interior to the exterior parts of the tubes and a return flow of condensed liquid from the exterior to the interior parts of said tubes, and means for bathing the exterior ends of said tubes in cool emanate air.

3. In an electrical apparatus having rotating means within which heat is generated during operation, means for dissipating said heat comprising a plurality of sealed tubes partially filled with a volatile liquid refrigerant, said tubes lying partly within and partly without said rotating means whereby the volatile liquid within the interior portions of the tubes is subjected to the generated heat to cause said refrigerant to boil and thus produce a flow of vapor from the interior to the exterior parts of the tubes and a return flow of condensed liquid from the exterior to the interior parts of said tubes, means for circulating air through said rotating member contiguous to said tubes, and means for bathing the exterior ends of said tubes in cool emanate air.

4. In a rotating device in which heat is generated, a plurality of sealed tubes partly imbedded within the interior of said device and having exterior portions exposed to an external cooling medium, cooling means on the external portions of said tubes, said tubes being partially filled with a volatile liquid refrigerant, and said tubes being arranged to permit the free flow of the vapor of said refrigerant from the interior to the exterior portions of the tube and to allow the condensed vapor to flow reversely from the exterior to the interior portions of the tube.

5. In a rotating device in which heat is generated, a plurality of sealed tubes partly imbedded within the interior of said device and having exterior portions exposed to an external cooling medium, said tubes being partially filled with a volatile liquid refrigerant, and said tubes being arranged to permit the free flow of the vapor of said refrigerant from the interior to the exterior portions of the tube and to allow the condensed vapor to flow reversely from the exterior to the interior portions of the tube, and means for circulating a cooling gas within said device whereby the same serves as a carrier of heat between hot parts thereof and said tubes 6. In a turbo generator rotor, a heat radiator comprising a multiplicity of spaced apart exteriorly disposed end-plates, a plurality of sealed tubes extending longitudinally through the rotor structure and having their exterior ends engaged with said end-plates, said sealed tubes being partially filled with a volatile liquid refrigerant adapted to convey heat from within the rotor by evaporation of said liquid, and the vapor of said liquid being condensed by radiation of heat from said end-plates for return to the imbedded portions of said tubes.

7. In a turbo generator rotor, a heat radiator comprising a multiplicity of spaced apart exteriorly disposed end-plates, a plurality of sealed tubes extending longitudinally through the rotor structure and having their exterior ends engaged with said end-plates, said sealed tubes being partially filled with a volatile liquid refrigerant adapted to convey heat from within the rotor by evaporation of said liquid, the vapor of said liquid being condensed by radiation of heat from said end-plates for return to the imbedded portions of said tubes, means to provide internal air passages in said rotor structure contiguous to said tubes, and means to provide radial air discharge passages communicating with said internal air passages whereby the air streams traversing said passages will carry heat from the hot interior parts of said rotor to the said tubes.

8. In a rotating device in which heat is generated, a plurality of sealed tubes extending through apertures in said device, said tubes being substantially parallel to the rotational axis of said device, a plurality of spaced exteriorly disposed end-plates engaging the free end portions of said tubes and serving to support said tubes against the action of centrifugal force, said tubes containing a volatile liquid that is adapted to decrease in density when heated by the hot interior parts of said device, the cooler and denser portions of said liquid at the outer ends of said tubes acting to continually displace the less dense liquid and vapor at the inner portions of said tubes outwardly to the outer end portions of said tubes where such heated liquid is cooled by conduction of heat to said end-plates and the surrounding air.

9. In a turbo generator having slots in its rotor to receive the rotor windings, a plurality of spaced end plates disposed at the ends of said rotor, said end plates having aligned apertures, a plurality of sealed tubes positioned in the bottoms of said rotor slots and having end portions projecting beyond the ends of said rotor, and through the apertures in said end plates, said tubes containing a volatile liquid for effecting the cooling of said rotor, and said end plates acting to support said tubes against the action of centrifugal force and to conduct heat away from said tubes so as to maintain said liquid in a cool condition.

10. In a turbo generator, having slots in its rotor to receive the rotor windings, a plurality of spaced end plates disposed at the ends of said rotor, said end plates having aligned apertures, a plurality of sealed tubes positioned in the bottoms of said rotor slots and having end portions projecting beyond the ends of said rotor and through the apertures in said end plates, said tubes containing a volatile liquid for effecting the cooling of said rotor, and said end plates acting to support said tubes against the action of centrifugal force and to conduct heat away from said tubes so as to maintain said liquid in a cool condition, said rotor being constructed and arranged so as to provide air passages contiguous to said tubes and additional air passages communicating with said first named passages and extending to the air gap between the rotor and stator.

In testimony that I claim the invention set forth above I have hereunto set my hand this 24th day of March, 1928.

FRAZER W. GAY.